United States Patent
Parodi et al.

(10) Patent No.: US 9,708,128 B2
(45) Date of Patent: Jul. 18, 2017

(54) HYBRID TRANSPORTATION SYSTEM FOR OBJECTS

(71) Applicant: LEONARDO S.p.A, Rome (IT)

(72) Inventors: Carlo Luigi Parodi, Rome (IT); Giovanni Iannacchino, Rome (IT)

(73) Assignee: LEONARDO S.P.A., Rome (IT)

( * ) Notice: Subject to any disclaimer, the term of this patent is extended or adjusted under 35 U.S.C. 154(b) by 0 days.

(21) Appl. No.: 15/223,417

(22) Filed: Jul. 29, 2016

(65) Prior Publication Data

US 2017/0029215 A1    Feb. 2, 2017

(30) Foreign Application Priority Data

Jul. 30, 2015    (IT) .................. 102015000040487

(51) Int. Cl.
| | |
|---|---|
| *B65G 17/34* | (2006.01) |
| *B65G 47/94* | (2006.01) |
| *B65G 54/02* | (2006.01) |
| *B65G 47/96* | (2006.01) |

(52) U.S. Cl.
CPC ......... *B65G 17/345* (2013.01); *B65G 47/945* (2013.01); *B65G 47/96* (2013.01); *B65G 54/02* (2013.01)

(58) Field of Classification Search
CPC .... B65G 17/345; B65G 47/945; B65G 54/02; B65G 47/96
USPC ..................................... 198/370.06
See application file for complete search history.

(56) References Cited

U.S. PATENT DOCUMENTS

| | | | | |
|---|---|---|---|---|
| 5,547,084 A | * | 8/1996 | Okada ............... | B65G 17/345 198/370.06 |
| 5,588,520 A | * | 12/1996 | Affaticati ............ | B61B 13/08 198/370.06 |
| 6,360,868 B1 | | 3/2002 | Arlt et al. | |
| 6,478,138 B1 | * | 11/2002 | Edwards ............ | B65G 17/345 198/370.06 |

FOREIGN PATENT DOCUMENTS

| | | |
|---|---|---|
| DE | 202014002923 | 6/2014 |
| EP | 0700844 | 3/1996 |
| WO | 2012/033408 | 3/2012 |

OTHER PUBLICATIONS

Italian Search Report in corresponding Italian Appl. No. ITUB20152622, dated Apr. 1, 2016.

* cited by examiner

*Primary Examiner* — Gerald McClain
*Assistant Examiner* — Keith R Campbell
(74) *Attorney, Agent, or Firm* — Greenblum & Bernstein, P.L.C.

(57) ABSTRACT

A transportation system for objects, wherein a train formed by a plurality of carriages moves along a rail and transports objects, for example parcels. The train comprises first carriages, each of which is provided with a pair of first motor-driven rectilinear belts, arranged with their longer edges mutually parallel and perpendicular to the direction of feed of the train. The first carriages alternate with second carriages, each of which is provided with just one second motor-driven rectilinear belt arranged with its own longer edges perpendicular to the direction of feed of the train. The distance between an edge of a first belt of the first carriage and a facing edge of the second belt of the second carriage is greater than the distance between facing edges of the belts of the first carriage.

15 Claims, 5 Drawing Sheets

HYBRID TRANSPORTATION SYSTEM FOR OBJECTS

The present invention relates hybrid transportation system for objects.

BACKGROUND OF THE INVENTION

The patent EP0633208 describes a method for sorting objects in which a plurality of articles having different sorting addresses are sorted using a plurality of high-efficiency carriages mobile along a rail. Each high-efficiency carriage is provided with four belts that are mobile in opposite directions of feed and are designed also to operate in a synchronous way. The objects may be fed onto/picked up from the carriage by belts arranged at the opposite sides of the carriage.

The above carriage is configured to displace objects of small dimensions that may be placed on a respective belt or on a pair of adjacent belts.

SUMMARY OF THE INVENTION

The aim of the present invention is to provide a transportation system that is particularly flexible and is capable of transportation, with a high carrying capacity, a flow of objects of different dimensions.

The above aim is achieved by the present invention in so far as it relates to a transportation system for objects in which a train formed by a plurality of carriages connected in series together through articulated joints moves along a rail driven by motor means, the train comprising first carriages arranged alternating with second carriages, the system being characterized in that: each first carriage comprises a supporting structure that carries a pair of first motor-driven rectilinear belts arranged with their longer edges mutually parallel and perpendicular to the direction of feed of the train, each first belt defining a plane rectangular support surface facing upwards, on which at least one object may be placed, the adjacent edges of said belts being spaced apart by a first distance d; and each second carriage comprises a supporting structure that carries just one second motor-driven rectilinear belt arranged with its own longer edges perpendicular to the direction of feed of the train.

BRIEF DESCRIPTION OF THE DRAWINGS

The invention will now be described with reference to the attached drawings, which illustrate a preferred non-limiting embodiment thereof and in which.

DETAILED DESCRIPTION OF THE INVENTION

Figure 1:
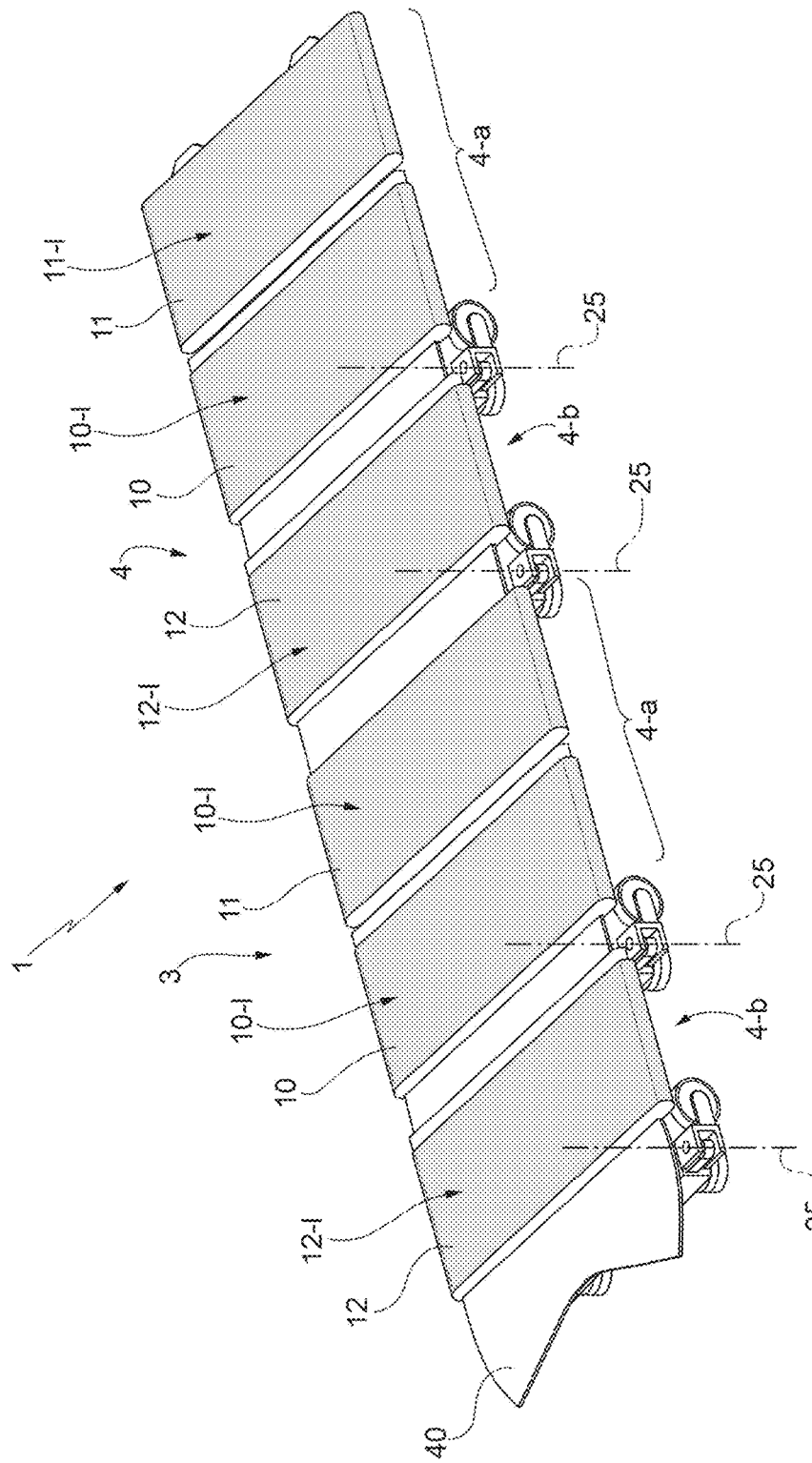
FIG. 1 is a perspective view from above of a transportation system for objects obtained according to the teachings of the present invention.

In the attached figures, designated as a whole by 1 is a transportation system for objects 7, in which a train 3 formed by a plurality of carriages 4 connected in series together by articulated joints 5 moves along a path defined by a rail 6 driven by a linear motor (illustrated hereinafter). Typically, but not exclusively, the path is closed and develops in a single plane.

The objects 7 transported generally comprise parcels of a parallelepiped al shape characterized by three characteristic dimensions, length L, width W, and height H. By way of non-limiting example, the characteristic parameters of the parcels 7 may be the following:

| Minimum values of length, width, and height | 20 × 20 × 2 (cm) |
|---|---|
| Mean values of length, width, and height | 45 × 35 × 25 (cm) |
| Maximum values of length, width, and height | 120 × 80 × 80 (cm) |
| Maximum value of perimeter | 350 (cm) |
| Minimum weight of the object | 0.05 kg |
| Mean weight of the object | 6 kg |
| Maximum weight of the object | 50 kg |

Other types of typically transportable objects are trays formed by a cup-shaped body having a rectangular perimeter in plan view.

The train comprises first carriages 4-a arranged alternating with second carriages 4-b. In the example, two first carriages 4-a and two second carriages 4-b are illustrated, but the number may obviously be different.

Figure 5:
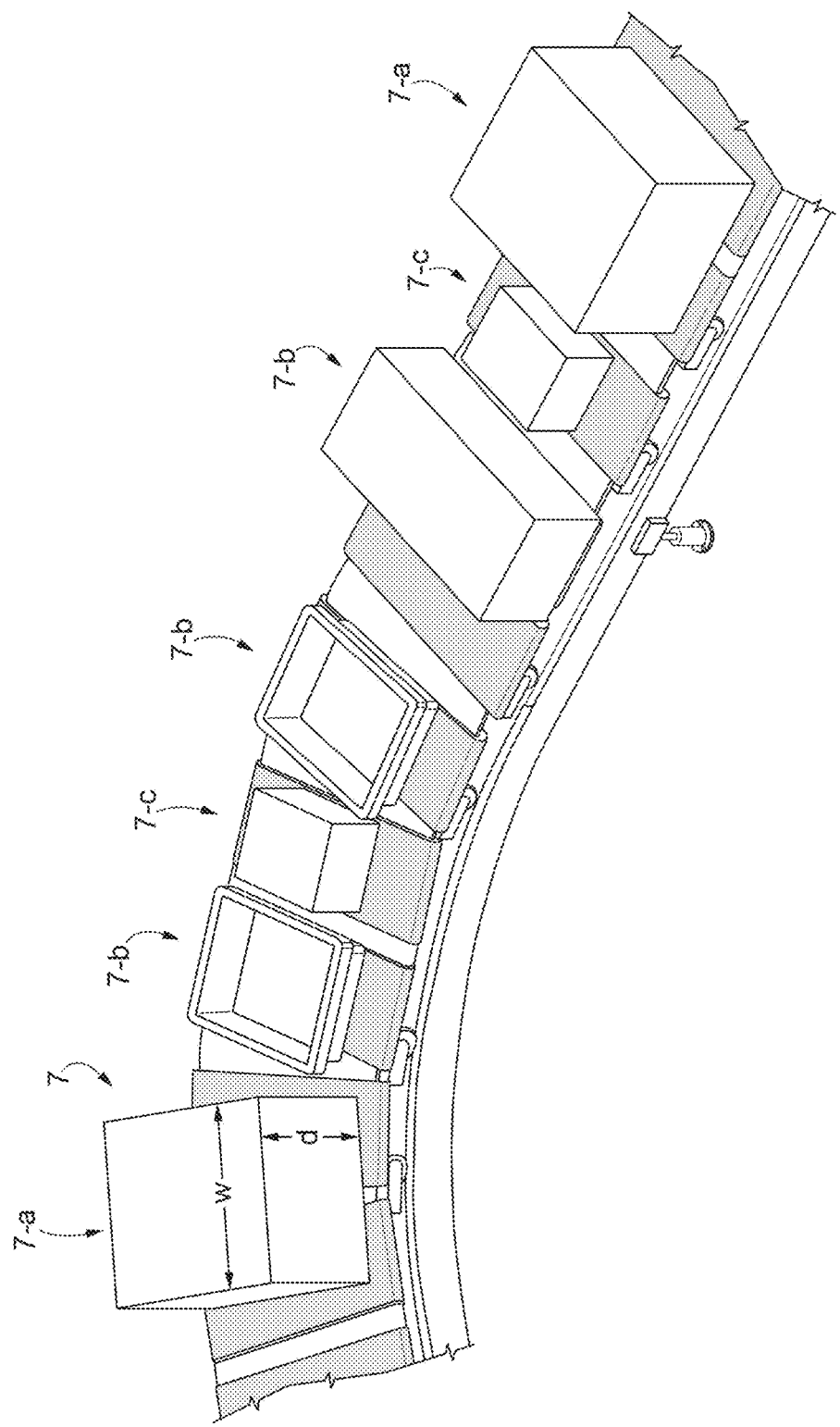
FIG. 5 illustrates a running condition during use of the transportation system of the present invention.

According to the present invention, each first carriage 4-a comprises a supporting structure 8-a, which carries a pair of first motor-driven rectilinear belts 10, 11 arranged with their longer edges mutually parallel and perpendicular to the direction of feed D of the train 1. Each first belt 10, 11 defines a plane rectangular support surface 10-1, 11-1 facing upwards, on which at least one object may be placed (see in this connection FIG. 5). The adjacent rectilinear edges of the belts 10, 11 are spaced at a first distance d apart, which in a non-limiting example may be 100 cm.

Each second carriage 4-b comprises a supporting structure 8-b, which carries just one second motor-driven rectilinear belt 12 arranged with its own longer edges perpendicular to the direction of feed D of the train 1. The second belt 12 defines a plane rectangular support surface 12-1 facing upwards, on which at least one object 7 may be placed. The distance D between one edge of the belt 11 of the first carriage 4-a and a facing edge of the second belt 12 of the second carriage 4-b is greater than the distance d, for example D=185 mm>d=100 mm.

Typically, but not exclusively, the first belts 10, 11 and the second belts 12 have the same width (for example, 460 mm), and the rectangular support surfaces 10-1, 11-1 and 12-1 defined by the first belts 10, 11 and by the second belts 12 have the same length (in the example, 700 mm). The support surfaces 10-1, 11-1 and 12-1 defined by the first belts (10, 11) and by the second belts 12 are coplanar with each other in planar portions of the path of the carriages.

The first belts 10, 11 are motor-driven independently by respective motors (not illustrated for simplicity). In greater detail, each belt 10, 11 extends between a first idle roller carried by a first end portion of the supporting structure 8-a and a second motor-driven roller carried by a second end portion of the supporting structure 8-a. Likewise, the belt 12 extends between a first idle roller carried by a first end portion of the supporting structure 8-b and a second motor-driven roller carried by a second end portion of the supporting structure 8-b.

Figure 2:
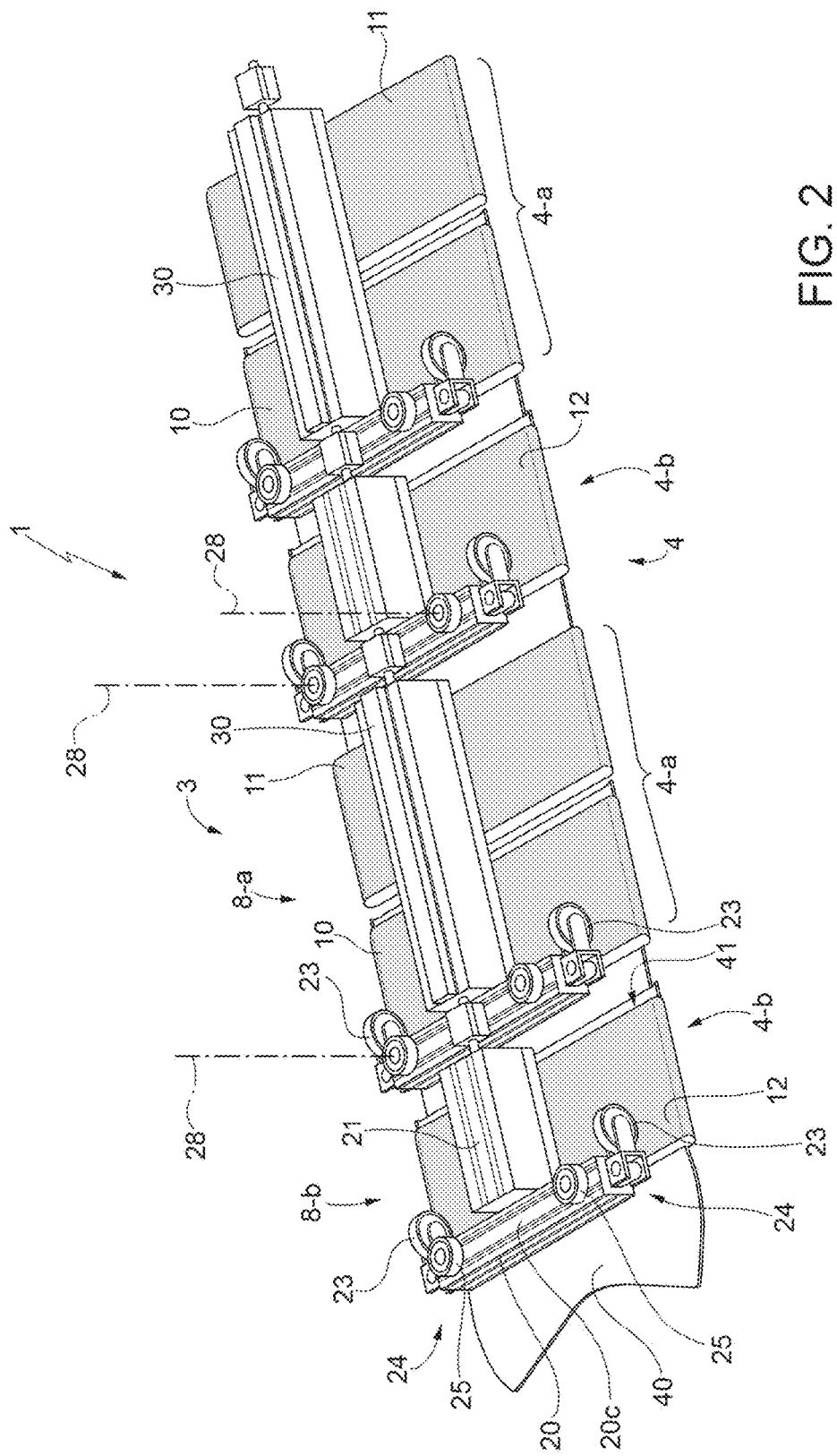
FIG. 2 is a perspective view from beneath of a transportation system for objects obtained according to the teachings of the present invention.

With reference to what is illustrated in FIG. 2, each supporting structure 8-*a*, 8-*b* is T-shaped and comprises a rectilinear cross-member 20 and a rectilinear upright 21, which extends from a central portion 20-*c* of the cross-member 20. The uprights 21 of the first carriages 4-*a* have a length that is substantially twice the length of the uprights 21 of the carriages 4-*b*, whereas the length of the cross-members 20 is the same in the carriages 4-*a* and 4-*b*. Typically, the uprights 21 and the cross-members 20 are of light metal material such as aluminium or aluminium alloys.

Each carriage 4-*a*, 4-*b* comprises a pair of idle wheels 23 carried by respective C-shaped supports 24, which are in turn carried by opposite end portions of the rectilinear cross-member 20. The idle wheels 23 are designed to be placed on plane top portions of respective rails 6-*a*, 6-*b*. Between the end portion of the cross-member 20 and the support are arranged bearings (not illustrated for simplicity) so that each support 24 is mobile about a respective vertical axis 25 perpendicular to the cross-member 20. In this way, the idle wheels 23 may be oriented with respect to the supporting structure for following the profile of the rail.

Each carriage 4-*a*, 4-*b* comprises a pair of idle contrast wheels 25 carried by the cross-member 20, arranged on opposite sides of the central area 20*c*, which are mobile about respective axes 28 perpendicular to the cross-member 20 and are configured to come into contact with internal portions of the rails 6-*a*, 6-*b* for centering the carriage 4-*a*, 4-*b* with respect to the rails 6-*a*, 6-*b* themselves. The contrast wheels are covered with rubber designed to produce a marked friction on the internal portions of the rails 6-*a*, 6-*b*.

At the end portion, the aforesaid upright 21 is provided with a first connection device (not illustrated) designed to couple with a second connection device (not illustrated) arranged in the central area of the cross-member 20 of an adjacent carriage to form an articulated joint 5. In this way, a first carriage 4-*a* and a second carriage 4-*b* coupled together constitute a set of carriages that is placed with four wheels 23 on the rails 6-*a*, 6-*b*.

A plane rectangular rectilinear magnet 30 is carried by the upright 21 and faces the rails 6. Obviously, the magnet 30 carried by the carriages 4-*a* has a length greater than (in particular, twice) the length of the magnet carried by the carriages 4-*b*.

The rectilinear magnet 30 forms the moving element of a linear motor provided with a stator 32, comprising an electromagnet arranged between the rails 6-*a*, 6-*b*. In any case, the technology of linear driving motors is known, and this detail will not be described any further.

Further provided are a power transfer system 34 of an electromagnetic transformer type between an insulated power line 36, which extends along the rail 6 and constitutes the primary of a transformer, and a C-shaped collector 38, which extends from the casing 8-*a*, 8-*b* towards the power line 36 constituting a secondary of the transformer.

Each carriage 4-*a*, 4-*b* is provided with a flexible flat wall 40, which extends horizontally, i.e., which extends from a front portion of the carriage 4-*a*, 4-*b* engaging a groove 41 of a rear portion of an adjacent carriage 4-*b*, 4-*a*, thus arranging itself so that it covers the gap existing between two adjacent carriages 4-*a*, 4-*b*.

The flexible flat wall 40 is configured to prevent a small object 7 from possibly getting trapped in the gap between two adjacent carriages 4-*a*, 4-*b*.

The flexible flat wall 40 is of a plastic material, lies in a plane parallel to the plane of the support surfaces 10-1, 11-1, and 12-1 and is delimited laterally by two curved lateral edges 42 and by a U-shaped front edge 43.

Figure 3:
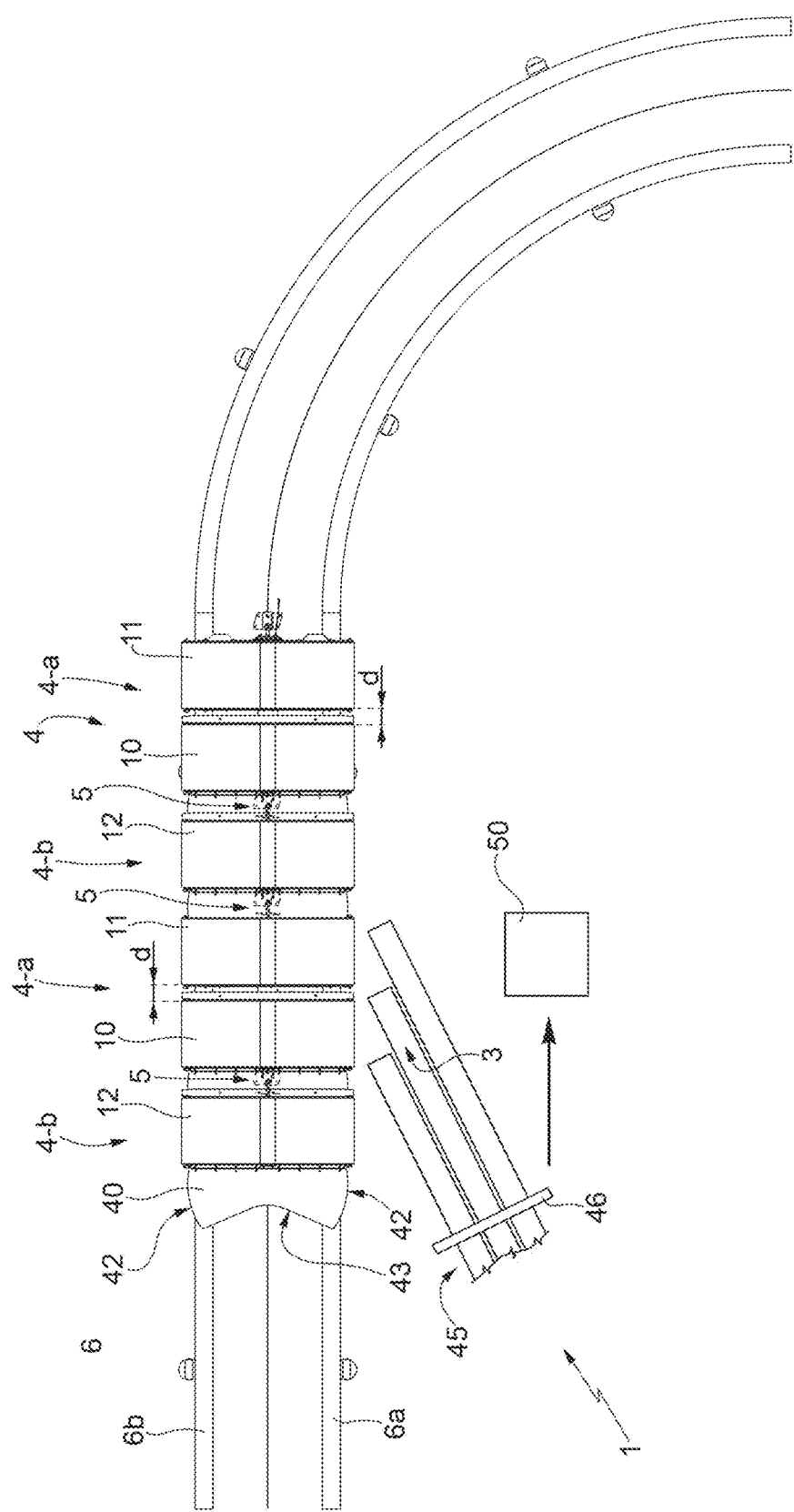
FIG. 3 is a top plan view of the system of FIGS. 1 and 2 in a first operating position (running along a rectilinear stretch of rail)
Figure 4:
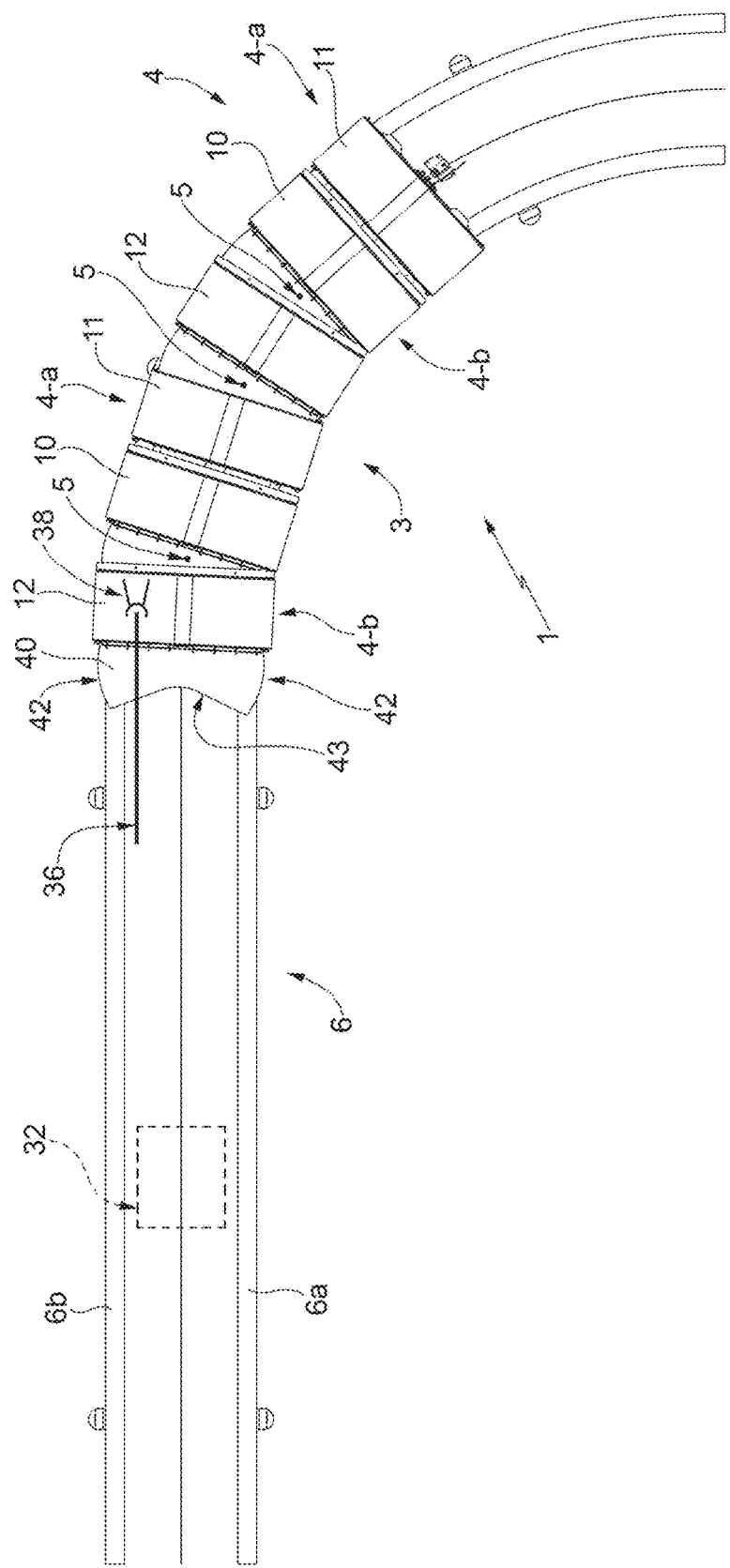
FIG. 4 is a top plan view of the system of FIGS. 1 and 2 in a second operating position (running along a curved stretch of rail)

During movement of the carriages 4-*a* and 4-*b* along a rectilinear stretch, the distance between each carriage and the adjacent one remains constant (FIG. 3). When the train takes a bend (FIG. 4*b*), the carriages turn with respect to one another about the articulated joints 5 to follow the curvature of the rails 6. The adjacent edges of the carriages 4-*a*, 4-*b* facing the inside of the curve approach one another without touching, whereas the adjacent edges of the carriages 4-*a*, 4-*b* facing the outside of the curve move away from one another. The distance D is in fact such as to prevent contact between the adjacent edges of the carriages facing the inside of the curve.

The system 1 envisages at least one feed branch 45 for feeding the objects onto the carriages 4-*a*, 4-*b*. For instance, the feed branch comprises a plurality of mutually parallel belts parallel to a direction of feed arranged inclined with respect to a rectilinear stretch of the rail 6.

The feed branch 45 is provided with a portal 46 equipped with optical devices of a known type for measurement of the dimensions of the objects 7 that advance along the feed branch.

Said optical devices co-operate with an electronic control unit of the feed branch, which is designed to detect:

a) bulky postal objects having at least one dimension L, W, or H greater than a threshold value; said postal objects may be loaded only within the perimeter formed by a pair of belts 10, 11;

b) medium-to-large postal objects having a width L greater than the width of the belt 10, 11; and c) standard postal objects having dimensions L, W, H comprised within the threshold values;

An electronic control unit 50 is designed to select a first carriage 4-*a* for transfer of the bulky object from the feed branch 45 to the first belts 10, 11. In this way, a base wall of the bulky object 7 is placed on the belts 10, 11. There is thus ensured positioning of a bulky object 7 on a carriage 4-*a* having dimensions such as to prevent contact between walls of the bulky object and walls of postal objects carried by adjacent carriages. The electronic control unit 50 inhibits depositing of a subsequent bulky/medium-to-large object on a carriage 4-*b* adjacent to the one selected in order to prevent any possible collisions between the objects and optimize detection of codes, in particular bar codes, provided on the objects. This configuration enables even large parcels to be managed on pairs of belts of a same carriage, with a better control when it is taking a bend (absence of sliding of the base against the belts, which occurs when a large parcel is loaded so that it straddles two carriages).

In the case where a medium-to-large object is identified, this is preferably, but not exclusively, loaded on a carriage 4-*a*.

The device 1 enables different categories of objects 7 to be efficiently transported. In particular, the alternation of carriages with different numbers of belts (two—one) enables a flexibility of use that increases considerably the overall operating efficiency of the transportation system. The larger objects may in fact be loaded onto the carriages 4-*a*, whereas the medium-sized objects may be indifferently loaded on the carriages 4-*a* and 4-*b*.

A specific advantage of the configuration described lies in the capacity of handling a large number of medium-to-large objects as compared to the number of small objects, and at the same time enables loading of small objects in each residual position. This configuration enables the medium-sized parcels to fit on each individual available carriage and/or on each belt available of a double belt even if one of the two belts is already occupied by a small object.

The invention claimed is:

1. A transportation system for objects in which a train formed by a plurality of carriages connected in series together through articulated joints moves along a path driven by a motor, the train comprising first carriages arranged alternating with second carriages, characterized in that:

each first carriage comprises a supporting structure that carries a pair of first motor-driven rectilinear belts arranged with their longer edges mutually parallel and perpendicular to the direction of feed of the train; each first belt defining a plane rectangular support surface facing upwards and configured to carry at least one object; the adjacent edges of said belts being spaced apart by a first distance; and each second carriage comprises a supporting structure, which carries just one second motor-driven rectilinear belt arranged with its own longer edges perpendicular to the direction of feed of the train; said second belt defining a plane rectangular support surface facing upwards and configured to carry at least one object.

2. A system according to claim 1, wherein a second distance between an edge of one first belt of the first carriage and a facing edge of the second belt of the second carriage is greater than the first distance.

3. A transportation system according to claim 1, wherein said first belts and said second belts have the same width, and the support surfaces defined by the first belts and by the second belts have the same length.

4. A transportation system according to claim 1, wherein the support surfaces defined by the first belts and by the second belts are coplanar with each other in planar portions of said path.

5. A transportation system according to claim 1, wherein said first belts are motor-driven independently by respective motors.

6. A transportation system according to claim 1, wherein each first/second belt extends between a pair of motor-driven rollers, one of which is a driving roller, carried by opposite end portions of said supporting structure.

7. A system according to claim 1, wherein: each supporting structure is T-shaped and comprises a rectilinear cross-member and a rectilinear upright, which extends from a central portion of the cross-member; each carriage comprising a pair of idle wheels carried by respective supports, which are in turn carried by end portions of the rectilinear cross-member, and designed to be placed on top portions of respective rails that define said path; and each support being mobile about a respective axis perpendicular to the cross-member;

each carriage comprising a pair of idle contrast wheels carried by the cross-member, which are arranged on opposite sides of the central area, are mobile about respective axes perpendicular to the cross-member, and are configured to come into contact with internal portions of the rails to center the carriage with respect to the rails themselves; an end portion of said upright being provided with a first connection device designed to couple with a second connection device arranged in the central area of the cross-member of an adjacent carriage to form a said articulated joint.

8. A system according to claim 7, wherein an elongated rectilinear flat magnet is carried by said upright and faces the rails; said rectilinear flat magnet constituting the moving element of a linear motor provided with a stator comprising an electromagnet arranged between said rails.

9. A system according to claim 1, wherein there is provided an electromagnetic transformer power transfer system between an insulated power line, which extends along said path and constitutes the primary of a transformer and a collector, which extends from said casing towards said power line, constituting a secondary of said transformer.

10. A system according to claim 1, wherein said first belts and said second belts have a width of 460 mm, and the rectangular support surfaces defined by the first belts and by the second belts have a length of 700 mm; said first distance is 100 mm; and said second distance of is 185 mm.

11. A system according to claim 1, wherein each carriage is provided with a flexible flat wall that extends horizontally from a front portion of the carriage, engaging a groove of a rear portion of an adjacent carriage, arranging itself so as cover the gap between two adjacent carriages; said flexible flat wall being configured to prevent an object from possibly getting trapped in the gap between two adjacent carriages.

12. A system according to claim 11, wherein said flat wall is delimited on opposite sides by two curved lateral edges and by a U-shaped front edge.

13. A system according to claim 1, wherein there is provided at least one feed branch for feeding objects to said carriages; said feed branch being provided with a portal equipped with optical devices for measuring the characteristic dimensions of the objects, which is designed to recognize at least one of the following:

a) bulky objects having at least one dimension greater than a threshold value; said bulky objects are loaded only within the perimeter formed by a pair of first belts;

b) medium-to-large postal objects having a width greater than the width of the first belts; and c) standard postal objects having dimensions comprised within the threshold values;

there being provided a control unit designed to: select a first carriage for transporting the bulky object from the feed branch to the first belts, on which a base portion of the bulky object is placed; and inhibit deposit of a subsequent bulky object on a carriage adjacent to the one selected in order to prevent any possible collisions between the objects.

14. A system according to claim 13, wherein said control unit is designed to load a medium-to-large object onto a first carriage.

15. A system according to claim 1, wherein said path is formed by a rail.

* * * * *